(12) United States Patent
Payne

(10) Patent No.: US 10,445,834 B1
(45) Date of Patent: Oct. 15, 2019

(54) METHOD AND SYSTEM FOR ADAPTIVE CONSTRUCTION OF OPTIMAL PORTFOLIO WITH LEVERAGE CONSTRAINT AND OPTIONAL GUARANTEES

(71) Applicant: Genesis Financial Development, Inc., Mississauga (CA)

(72) Inventor: Richard C. Payne, Mississauga (CA)

(73) Assignee: Genesis Financial Development, Inc., Mississauga (CA)

( * ) Notice: Subject to any disclaimer, the term of this patent is extended or adjusted under 35 U.S.C. 154(b) by 346 days.

(21) Appl. No.: 14/470,129

(22) Filed: Aug. 27, 2014

Related U.S. Application Data

(60) Provisional application No. 61/928,805, filed on Jan. 17, 2014.

(51) Int. Cl.
*G06Q 40/06* (2012.01)

(52) U.S. Cl.
CPC .................................. *G06Q 40/06* (2013.01)

(58) Field of Classification Search
USPC ..................................................... 705/35, 36
See application file for complete search history.

(56) References Cited

U.S. PATENT DOCUMENTS

| | | | | |
|---|---|---|---|---|
| 7,613,646 | B2 * | 11/2009 | Luenberger | G06Q 40/06 705/36 R |
| 7,680,719 | B1 * | 3/2010 | Brady | G06Q 40/06 705/36 R |
| 7,716,075 | B1 | 5/2010 | Payne | |
| 8,566,184 | B1 * | 10/2013 | Paluck | G06Q 40/06 705/30 |
| 8,756,140 | B1 * | 6/2014 | Menchero | G06Q 40/06 705/1.1 |
| 2002/0091605 | A1 * | 7/2002 | Labe, Jr. | G06Q 10/04 705/36 R |

(Continued)

OTHER PUBLICATIONS

Mean Variance Optimization: Multi-Asset Portfolio—AAII Journal Oct. 2011 (Year: 2011).*

(Continued)

*Primary Examiner* — William E Rankins
(74) *Attorney, Agent, or Firm* — Simpson & Simpson, PLLC

(57) ABSTRACT

An apparatus including: a processor configured to obtain asset return data for assets in a portfolio; populate initial estimated portfolio covariance matrix; compute initial portfolio weights for the assets; obtain respective amount of the assets according to the weights; populate an updateable matrix decomposition using the estimated portfolio covariance matrix and a scaling factor limiting respective degrees of negativity for the weights; obtain an update to the asset return data; update the updateable matrix decomposition according to the update; modify the weights using the updated matrix decomposition; and modify the assets in the portfolio according to the modified respective weights by purchasing or selling an additional quantity of an asset included in the portfolio to increase an amount of the asset included in the portfolio or selling a portion an asset included in the portfolio to decrease an amount of the asset included in the portfolio.

32 Claims, 2 Drawing Sheets

(56) References Cited

U.S. PATENT DOCUMENTS

| | | | | |
|---|---|---|---|---|
| 2006/0190371 A1* | 8/2006 | Almgren | G06Q 40/00 705/35 |
| 2009/0292648 A1* | 11/2009 | Damschroder | G06Q 40/00 705/36 R |
| 2012/0185406 A1* | 7/2012 | Ghosh | G06Q 40/06 705/36 R |
| 2013/0080310 A1* | 3/2013 | Bell | G06Q 40/06 705/37 |
| 2014/0081889 A1* | 3/2014 | Renshaw | G06Q 40/06 705/36 R |
| 2014/0108295 A1* | 4/2014 | Renshaw | G06Q 40/06 705/36 R |
| 2017/0287074 A1* | 10/2017 | Aber | G06Q 40/06 |

OTHER PUBLICATIONS

Risk Decomposition for Portfolio Simulations—Marco Machiori Apr. 2010 (Year: 2010).*

Portfolio Theory with Matrix Algebra—University of Washington—Aug. 2013 (Year: 2013).* http://www.nytimes.com/2013/03/12/business/sec-accuses-illinois-of-securities-fraud.html?_r=0&pagewanted=print, Mar. 11, 2013.

Markowitz, Harry. "Portfolio Selection," The Journal of Finance, vol. 7, No. 1. Mar. 1952, pp. 77-91, https://www.math.ust.hk/~maykwok/courses/ma362/07F/markowitz_JF.pdf.

Uniform Prudent Investor Act, National Conference of Commissioners on Uniform State Laws, Annual Conference Chicago, Illinois, Jul. 29-Aug. 5, 1994, at: http://www.uniformlaws.org/shared/docs/prudent%20investor/upia_final_94.pdf.

Hull, John C. "Options, Futures, and Other Derivative Securities," Prentice Hall, Seventh Edition, University of Toronto, 1989, pp. 119-121.

Rebonato, Riccardo. "Volatility and Correlation," in the Pricing of Equity, FX, and Interest-Rate Options, John Wiley & Sons, Ltd., © 1999, Chapters 10 and 11, pp. 293-345.

Kelly, Jr. J.L. "A new interpretation of information rate," Bell Syst. Techn. J. 35, Mar. 21, 1956, pp. 917-926, available at: http://www.bjmath.com/bjmath/kelly/kelly.pdf.

Luenberger, David G. "Investment Science," Stanford University, Oxford University Press, 1998, Chapters 9 and 15, pp. 228-259; 417-443.

Platen, Eckhard, "A Benchmark Approach to Investing and Pricing," University of Technology Sydney, Australia, Aug. 28, 2009, available at: http://www.business.uts.edu.au/qfrc/research/research_papers/rp253.pdf.

Baxter, Martin, and Andrew Rennie. "Financial Calculus; An introduction to derivative pricing," Cambridge University Press, 1996, pp. 30, 42, 63-76.

Research Paper 281 of the Quantitative Finance Research Centre at the University of Technology, Sydney, Australia, Jul. 2010, See: http://www.business.uts.edu.au/qfrc/research/research_papers/rp281.pdf.

Hakansson, Nils H., and William T. Ziemba. "Capital Growth Theory," Chapter 3 in Handbooks in OR & MS, vol. 9, 1995, pp. 65-86, Elsevier Science B.V., available at http://www.hakansson.com/nils/papers/capital95.pdf.

Platen, Eckhard. "A Benchmark Approach to Quantitative Finance," School of Finance and Economics and Department of Mathematical Sciences, University of Technology, Springer Finance, Sydney, Australia, 2006, pp. 372-374.

Cameron-Martin-Girsanov transformation and the Radon-Nikodym derivative. See for example: http://www.chiark.greenend.org_uk/~alanb/stoc-calc.pdf.

Le, Turc and Eckhard Platen. "Approximating the Growth Optimal Portfolio with a Diversified World Stock Index," Research Paper 184, University of Technology Sydney, Australia, Sep. 2006, available at: http://www.business.uts.edu.au/qfrc/research/research_papers/rp184.pdf.

Bogleheads website at: http://www.bogleheads.org/wiki/Foreign_tax_credit, Nov. 3, 2013.

Allianz High Five variable annuity (VA) prospectus, Allianz Life Insuracne Company of North America, Apr. 28, 2014, available at: https://www.allianzlife.com/content/public/Literature/Documents/HFV-001.pdf.

Gilbert Strang, Linear Algebra and Its Applications, 2nd Edition, Academic Press, 1980, pp. 142-144.

Forman S. Acton, Numerical Methods That Work, Harper & Row, 1970, pp. 322-329.

Golub et al., Matrix Computations, 2nd Edition, 1989, The Johns Hopkins University Press, Section 3.5.4, pp. 128-131.

Demiguel et al., Optimal Versus Naive Diversification: How Inefficient is the 1/N Portfolio Strategy?, 2007, Oxford University Press, Available at http://faculty.london.edu/avmiguel/DeMiguel-Garlappi-Uppal-RFS.pdf.

G.W. Stewart, An Updating Algorithm for Subspace Tracking, IEEE Transactions on Signal Processing, vol. 40, No. 6, Jun. 6, 1992, pp. 1-19.

Wang et al., Random-Weight Generation in Multiple Criteria Decision Models, Jun. 2006, Available at http://citeseerx.ist.psu.edu/viewdoc/download?doi=10.1.1.109.791&rep=rep1&type=pdf.

Abramowitz et al., Handbook of Mathematical Functions, Chapter 26: Probability Functions, Jun. 1964, p. 932.

* cited by examiner

US 10,445,834 B1

METHOD AND SYSTEM FOR ADAPTIVE CONSTRUCTION OF OPTIMAL PORTFOLIO WITH LEVERAGE CONSTRAINT AND OPTIONAL GUARANTEES

CROSS-REFERENCE TO RELATED APPLICATIONS

This application claims the benefit under 35 U.S.C. § 119€ of U.S. Provisional Application No. 61/928,805, filed Jan. 17, 2014, which application is incorporated herein by reference in its entirety.

TECHNICAL FIELD

The present disclosure relates to investment portfolio construction, and more specifically to efficient adaptive construction of a leverage-constrained approximately optimal investment portfolio as additional financial data become available over time.

REFERENCE TO COMPUTER PROGRAM LISTING APPENDIX

The present application includes a computer program listing appendix. The appendix contains an ASCII text function of the computer program listing or sample file input data as follows:

| | | |
|---|---|---|
| copog1b | 5 KB | Created Dec. 10, 2013 |
| gop2b | 4 KB | Created Dec. 10, 2013 |
| LS5a | 20 KB | Created Jun. 2, 1999 |
| svd3a | 2 KB | Created Jan. 13, 2005 |
| worldva1b | 6 KB | Created Dec. 10, 2013 |

BACKGROUND

Investors (e.g. individuals, institutions, pension plans, mutual fund managers, and insurance companies) want to achieve high investment returns. However, many investors have failed to achieve this goal. From the collapse of Long-Term Capital Management in 1998, through the world financial crisis triggered by subprime lending, through current state pension funding crises, long-term performance has been elusive. See for example: http://www.nytimes.com/2013/03/12/business/sec-accuses-illinois-of-securities-fraud.html?_r=0&pagewanted=print Over the last half-century or so, a number of mathematical approaches to portfolio construction have been developed and become well-known. The concept of a risk vs. return trade-off (exemplified in Harry Markowitz's Modern Portfolio Theory as the concept of "efficient frontier") is perhaps the best example. The concept of a risk vs. return tradeoff is so pervasive in modern investment thinking that it has been adopted in investment law: see, for example, page 1 of the Uniform Prudent Investor Act at: http://www.uniformlaws.org/shared/docs/prudent%20investor/upia_final_94.pdf where it is stated "The tradeoff in all investing between risk and return is identified as the fiduciary's central consideration".

Given a specific set of mathematical assumptions including assumed parameter values, there is a unique portfolio that on an expected-value basis outperforms every other portfolio in the long run, and is not systematically outperformed by other portfolios, even in the short run. This portfolio goes by many names in the literature, as described below, but hereinafter is referred to as "the optimal portfolio." The assumed parameters include asset correlations and interest rates. In many applications, the assumed parameters are estimated from historical data or from market-implied values.

Implied values are parameter values that are inferred from available financial data rather than estimated from historical data. A good example is implied volatility, in which the volatility to use in the Black-Scholes option-pricing equation is "backed out" from observed option prices. Another good example is the implied correlation of forward interest rates, which can be backed out from observed swaption (option on an interest rate swap) prices. See: *Options, Futures, and Other Derivative Securities* by John Hull, Prentice Hall, © 1989, in which Section 5.9 deals with implied volatilities, and *Volatility and Correlation in the Pricing of Equity, FX, and Interest-Rate Options* by Riccardo Rebonato, Wiley, © 1999, in which Chapters 10 and 11 deal with implied volatilities and correlations in interest rate models.

The optimal portfolio satisfies the Kelly criterion (first published in 1956 as an analysis of optimal wagers in a favorable gambling game). See: A new interpretation of information rate, J. R. Kelly, Bell Syst. Techn. J. 35, 917-926, available at: http://www.bjmath.com/bjmath/kelly/kelly.pdf The ideas are presented in a more traditional investment context in, for example, Chapters 9 and 15 of *Investment Science* (David Luenberger, Oxford University Press, (c) 1998).

The optimal portfolio is also described in: *A Benchmark Approach to Investing and Pricing*, by Eckhard Platen, available at: http://www.business.uts.edu.au/qfrc/research/research_papers/rp253.pdf Key points regarding the optimal portfolio include:

1. The optimal portfolio is also known as the Growth-Optimal Portfolio, GOP, the Kelly portfolio, the log-optimal portfolio, or the numeraire portfolio.

2. In Platen's formulation, the optimal portfolio is strictly non-negative (no asset is shorted) and is constructed from the zeroth (risk-free) and risky assets numbered 1 to n. The non-negative proviso is not part of the standard definition of the optimal portfolio given by other researchers on the topic: we refer to this as the Platen restriction.

3. All nonnegative (long-only) portfolios denominated in terms of the Platen-restricted optimal portfolio (giving a "benchmarked value" of the portfolio) are supermartingales. "Supermartingale" is a term from probability theory meaning that on an expected value basis the benchmarked value of the portfolio (i.e. its value divided by the value of the optimal portfolio) stays the same or declines.

4. The optimal portfolio is optimal over specified intervals of time (i.e. the expected growth rate of all other nonnegative portfolios is no greater).

5. The optimal portfolio also has the highest long-term growth rate, i.e. the limiting behavior of the portfolio described in the point (4) above is as expected.

6. The optimal portfolio cannot be systematically outperformed (given a technical definition of "systematically outperformed").

7. The market portfolio may differ from the optimal portfolio. This is a big departure from the usual thinking about the risk vs. return tradeoff, where any deviation from the market portfolio is taken as a "tilt" that increases risk.

8. There is a "real-world" asset price formula using the value of the optimal portfolio that does not depend on the existence of an equivalent risk-neutral probability measure. This is an important result. For example, option prices matching those obtained using the Black-Scholes formula can be obtained using a real-world measure rather than using the Black-Scholes risk-neutral assumptions. Measures are described in, for example *Financial Calculus* (Martin Baxter and Andrew Rennie, Cambridge University Press, © 1996).

9. For claims that do not depend on the risky assets, e.g. the price of a bond with a fixed coupon rate, there is a pricing formula based on zero-coupon bond prices. So despite the fact that the optimal portfolio is risky, simple claims (such as the value today of $1 due ten years from now) can be priced as usual.

10. Strong arbitrage (the existence of a portfolio that starts with zero capital and ends up with positive capital with a positive probability) is ruled out.

11. There is a Diversification Theorem, as follows: given enough assets and noise sources in the market, diversified portfolios approach the optimal portfolio. The formulation of the preceding theorem is complicated. The Naive Diversification Theorem given in Platen and Rendek's paper (see next paragraph) is easier to understand.

The Naive Diversification Theorem is given in Platen and Rendek's paper (*Approximating the Numeraire Portfolio by Naive Diversification*, Eckhard Platen and Renata Rendek, Research Paper 281 of the Quantitative Finance Research Centre at the University of Technology, Sydney, Australia). See: http://www.business.uts.edu.au/qfrc/research/research_papers/rp281.pdf Hakansson and Ziemba, in section 3.1 of *Capital Growth Theory* (Nils H. Hakansson and William T. Ziemba, Chapter 3 in Handbooks in OR & MS, Vol. 9, © 1995 Elsevier Science B.V., available at http://www.hakansson.com/nils/papers/capital95.pdf) develop an additional key property of the optimal portfolio investment strategy: the strategy is "myopic". By this the authors mean that only current-period returns and covariances are needed in order to achieve optimal behavior in the long run. This is to be distinguished from the dynamic programming approach commonly used to price options, for example, which would typically involve recursive, backwards-in-time solution of the portfolio composition and value given desired final conditions.

Luenberger (cited above) gives an explicit version of the two-fund theorem in the multi-period context. The theorem states that any efficient portfolio can be constructed from a mixture of the minimum variance portfolio and the optimal portfolio. In the case where there is a risk-free asset, Luenberger shows (equation 15.6) how to find the composition of the optimal portfolio if both long and short assets are permitted (i.e. ignoring the Platen restriction). Luenberger only deals with the case in which the asset return covariance matrix has full rank and is therefore invertible.

The optimal portfolio is also treated in *A Benchmark Approach to Quantitative Finance* (Eckhard Platen, David Heath, Springer, (c) 2006). Note that the authors' definition of the optimal portfolio as being necessarily nonnegative (referred to above as the Platen restriction) does not allow shorting of any asset and therefore differs from Luenberger's. The rationale for imposing the Platen restriction is that, in a jump diffusion model, any asset's value can jump to zero instantaneously (even if this happens very rarely), and if a short position were permitted the portfolio value could thereby become negative. Jump-diffusion models allow for market crashes and are therefore thought to be more realistic than those employing only geometric Brownian motion A "leverage-constrained" optimal portfolio is a generalized definition encompassing both the Luenberger and Platen definitions of the optimal portfolio. A "leverage-constrained" optimal portfolio is one in which the amount of assets that can be shorted is greater than or equal to zero and less than or equal to the amount in the Luenberger solution. For example, this definition is applicable to the case in which an investor cannot borrow at the risk-free rate but must pay a spread over that rate because of institutional constraints or credit ratings.

As noted in above, the optimal portfolio has convenient numeraire properties for asset valuation. The word "numeraire" may require some explanation: it is defined in *Financial Calculus* (op. cit.) as "A basic security relative to which the value of other securities can be judged. Often the cash bond." Here the numeraire is not the cash bond (or bank account), but a mixture of the risk-free and risky assets, possibly with a non-negativity constraint imposed.

It is well-known that stock options can be valued (using the Black-Scholes formula) as the expected discounted value of the option payoff under the so-called risk-neutral probability measure. Under this measure the stock index is assumed to grow at the risk-free rate (often taken to be the yield on United States (U.S.) government bonds or U.S. dollar denominated interest rate swaps—what Baxter and Rennie refer to as the "cash bond") less the dividend rate. The risk-neutral measure is very explicitly not the real-world measure, although the two measures are linked by the Cameron-Martin-Girsanov transformation and the Radon-Nikodym derivative. See for example: http://www.chiark.greenend.org.uk/~alanb/stoc-calc.pdf Intuitively, the Radon-Nikodym derivative is the ratio of the risk-neutral probability density for the stock price to the real-world probability density for the stock price. In contrast it is possible to price options using the real-world measure if the optimal portfolio is used as numeraire (hence the term numeraire portfolio). This is a convenient alternative to risk-neutral pricing. Black-Scholes option prices can be reproduced using the real-world measure as shown below.

Given the existence of the optimal portfolio, the current benchmarked values of all assets are greater than or equal to their future benchmarked values: technically they are supermartingales as described above. All values are computed under the real-world, not risk-neutral, measure. This implies that no asset portfolio systematically outperforms the optimal portfolio. If the Platen restriction is in effect, then the correct statement is "no nonnegative asset portfolio systematically outperforms the optimal portfolio".

If the Platen restriction is in effect, it can be shown (under suitable assumptions) that an equally-weighted world stock portfolio approaches a real-world proxy for the optimal portfolio in the limiting case. This is described in the Platen & Heath text cited above and in the Platen & Le paper *Approximating the Growth Optimal Portfolio with a Diversified World Stock Index* ((c) 2006), available at: http://www.business.uts.edu.au/qfrc/research/research_papers/rp184.pdf Describing a portfolio in the limiting case and with known covariances and returns is of course an idealization. Real-world volatilities and returns change over time, and the limiting case of an infinite number of assets is never actually reached. This indicates that estimation and smoothing of returns and covariances, and efficient processing in the case of large numbers of assets, will be significant in any real-life application.

Another important point is that in the real world many investors are taxable (pension funds being a notable exception). Practical portfolio optimality may therefore, in addition to mathematical theory, require consideration of practical tax issues.

Some U.S. Tax Code considerations for international investment are outlined below.

A focus on international equity investment through a U.S.-domiciled mutual fund is appropriate for many U.S. investors. Although many investors concentrate their efforts on trying to identify and buy undervalued investments with the hope of selling them at a higher price, dividends can also contribute substantially to investment returns.

Not all dividends are taxed equally, however. The U.S. Tax Code distinguishes between qualified and non-qualified dividends. Typically, nonqualified dividends will be taxed at the taxpayer's marginal rate, which could be as high as 39.6% ignoring Medicare tax, whereas qualified dividends are taxed at 20%.

Dividends from publicly-traded U.S. corporations are usually qualified dividends. Dividends from publicly-traded corporations engaged in an active trade or business domiciled in countries with which the U.S. has a tax treaty are also usually qualified dividends.

U.S.-domiciled mutual funds investing in international assets are subject to more complex considerations. Foreign-domiciled mutual funds are not considered in this disclosure since such funds generally have a number of disadvantages under U.S. tax law, and Americans are generally prevented from investing in them under U.S. securities law.

The foreign jurisdictions with which the U.S. has tax treaties generally have withholding tax in place on dividend income, often at a rate of 15%. There are two main alternatives for fund shareholders to get credit for these taxes on their U.S. tax returns, reducing or even eliminating double taxation:

1. The foreign tax deduction: the fund shareholder can choose to deduct foreign taxes paid as an expense. So, for example, if the shareholder pays tax at a 40% marginal rate, the incremental tax reduction will be 40% of the foreign tax.

2. The foreign tax credit: the fund shareholder can credit foreign taxes against U.S. tax payable (within limits). This is clearly more favorable tax treatment for the fund shareholder than the foreign tax deduction.

According to the Bogleheads website at: http://www-.bogleheads.org/wiki/Foreign_tax_credit, U.S. taxpayers cannot claim foreign tax credits for foreign mutual funds held in IRA's, 401(k)'s, or variable annuities (VA's). However the Allianz High Five variable annuity (VA) prospectus, available at: https://www.allianzlife.com/content/public/Literature/Documents/HFV-001.pdf says: "We may benefit from any foreign tax credits attributable to taxes paid by certain funds to foreign jurisdictions to the extent permitted under the federal tax law."

The implication is clear: a life insurance carrier can benefit from the foreign tax credit for funds held in a separate account backing an ordinary VA.

Some of the U.S. tax code considerations noted above, as applied to a VA, may depend on the details of the separate account structure. The Bogleheads article says there is no credit for foreign taxes in a fund-of-funds structure, but that may not carry over to tax treatment for a carrier holding assets in separate account.

There are different U.S. tax code considerations for a tax flow-through annuity (see U.S. Pat. No. 7,716,075). The product is not tax-deferred, the carrier has legal title to the fund assets, and the key tax flow-through feature is that the annuity owner owns the funds for tax purposes (this is how capital gains treatment for sale of fund shares is achieved, for example). It therefore seems very likely that the tax flow-through annuity owner can claim the foreign tax credit.

If a diversified world fund's holdings are about 50% outside the U.S., with dividends being paid at 3% or so (but possibly much higher if the stocks held are for instance Australian or Canadian), and 15% withholding applies (the standard tax treaty rate described above) then there will be a 0.225% per year pricing advantage for a variable annuity (VA) with such holdings. Although this may seem like a small advantage, over a 30-year holding period it could easily lead to account balances 6-7% higher than otherwise: for example, $(1.05225^{30}) \div 1.05^{30} = 1.0663$.

Although turning qualified dividends into ordinary income may be undesirable, putting high-dividend foreign stocks into a VA creates a product suited to a low domestic yield environment.

If one can select an international (that is, ex-U.S.) stock portfolio with a dividend yield of 4% or so, then credit for an assumed 15% withholding tax generates a tax credit of about 0.60%. This would work well for high-yielding Canadian stocks such as Telus or Bell-Alliant, for example.

If the carrier prices in full knowledge of the above tax credit, then other product expenses such as the mortality and expense risk charge (M&E), or more generally the fund management fee if multiple foreign funds are offered, can be reduced, providing higher tax-deferred yield to clients.

SUMMARY

According to aspects illustrated herein, there is provided a computer-based method for adaptive construction of an optimal portfolio subject to a leverage constraint, including: storing computer executable instructions in a memory element of a computer; and executing, using a processor for the computer, the computer readable instructions to: obtain a plurality of asset return data for said each asset in a plurality of assets in a portfolio; populate an initial estimated portfolio covariance matrix. Each row in the initial estimated portfolio covariance matrix represents an asset from the plurality of assets. Each column in the initial estimated portfolio covariance matrix represents an asset from a plurality of assets in a portfolio. Each entry in the initial estimated portfolio covariance matrix is a co-variance of a return of the asset represented in the row for said each entry with respect to performance of the asset represented in the column for said each entry. The method includes executing, using the processor, the computer readable instructions to: compute an initial respective optimal portfolio weight for each asset included in the plurality of assets, each respective optimal portfolio weight being a respective proportion of said each asset included the portfolio; obtain a respective amount of said each asset such that said each asset forms a respective portion of the portfolio substantially equal to the respective weight for said each asset; populate an updateable matrix decomposition using the estimated portfolio covariance matrix and a scaling factor, the scaling factor limiting a degree of negativity for said each respective optimal portfolio weight; obtain at least one first update to the plurality of asset return data for said each asset in the plurality of assets; update the updateable matrix decomposition to include the at least one first update to return data for each asset in the updateable matrix decomposition; modify the respective optimal portfolio weights using the updated matrix decomposition; and modify the assets in the portfolio so that the assets form respective portions of the portfolio substantially equal to the modified respective weights for the assets by purchasing an additional quantity of at least one asset included in the portfolio to increase an amount of the at least one asset included in the portfolio or selling a portion of at least one asset included in the portfolio to decrease an amount of the at least one asset included in the portfolio. The updateable matrix decomposition is updated for one new row of asset returns at a time, and the floating-point operation count to perform the update is asymptotically no more than quadratic in the number of assets.

According to aspects illustrated herein, there is provided a computer-based apparatus for adaptive construction of an optimal portfolio subject to a leverage constraint, including: a memory element of a computer configured to store computer executable instructions and a processor for the computer configured to execute the computer readable instructions to: obtain a plurality of asset return data for said each asset in a plurality of assets in a portfolio; and populate an initial estimated portfolio covariance matrix. Each row in the initial estimated portfolio covariance matrix represents an asset from the plurality of assets. Each column in the initial estimated portfolio covariance matrix represents an asset from a plurality of assets in a portfolio. Each entry in the initial estimated portfolio covariance matrix is a co-variance of a return of the asset represented in the row for said each entry with respect to performance of the asset represented in the column for said each entry. The processor is configured to execute the computer readable instructions to: compute an initial respective optimal portfolio weight for each asset included in the plurality of assets, each respective optimal portfolio weight being a respective proportion of said each asset included the portfolio; obtain a respective amount of said each asset such that said each asset forms a respective portion of the portfolio substantially equal to the respective weight for said each asset; populate an updateable matrix decomposition using the estimated portfolio covariance matrix and a scaling factor, the scaling factor limiting a degree of negativity for said each respective optimal portfolio weight; obtain at least one first update to the plurality of asset return data for said each asset in the plurality of assets; update the updateable matrix decomposition to include the at least one first update to return data for each asset in the updateable matrix decomposition; modify the respective optimal portfolio weights using the updated matrix decomposition; and modify the assets in the portfolio so that the assets form respective portions of the portfolio substantially equal to the modified respective weights for the assets by purchasing an additional quantity of at least one asset included in the portfolio to increase an amount of the at least one asset included in the portfolio or selling a portion of at least one asset included in the portfolio to decrease an amount of the at least one asset included in the portfolio. The updateable matrix decomposition is updated for one new row of asset returns at a time, and the floating-point operation count to perform the update is asymptotically no more than quadratic in the number of assets.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
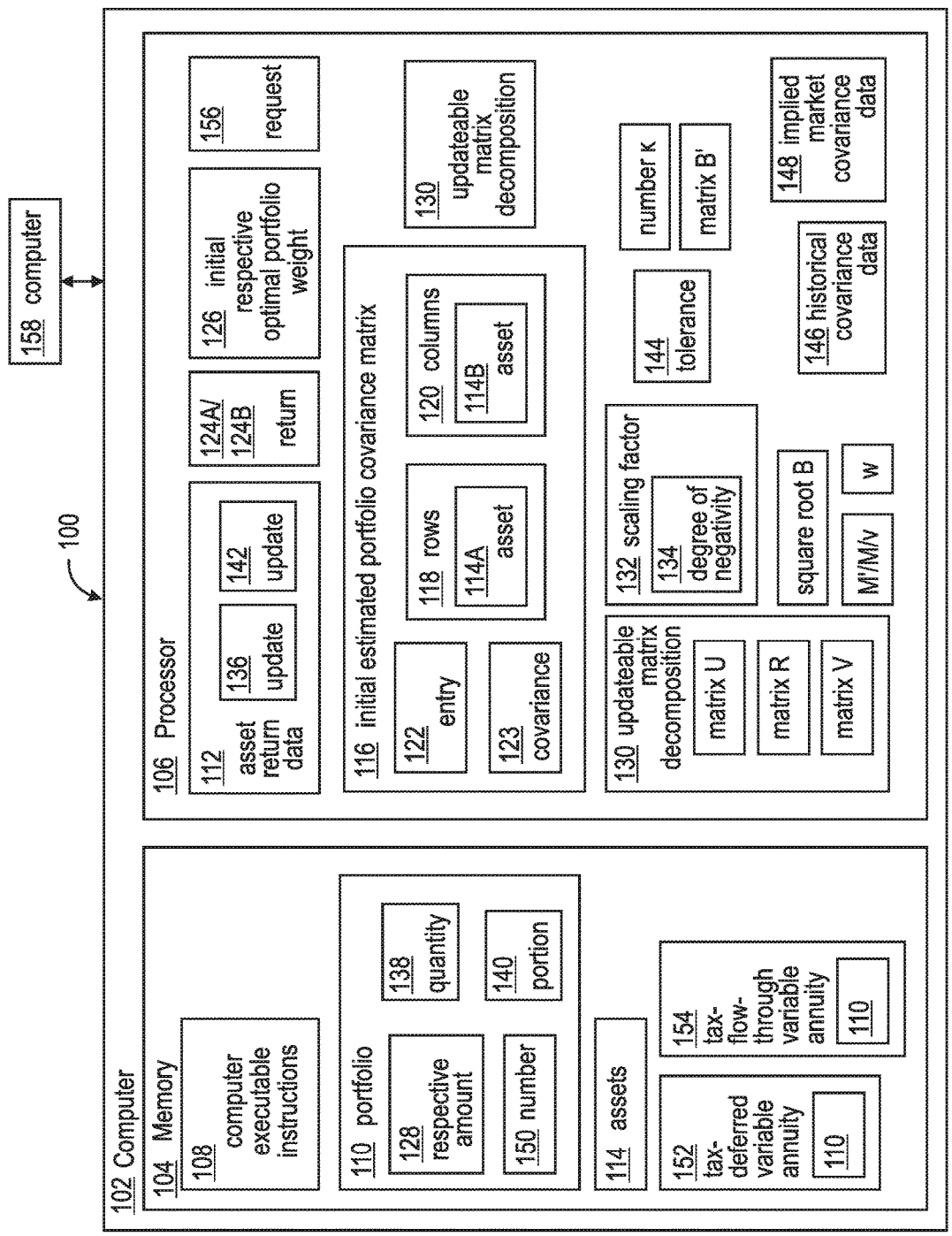
FIG. 1 is a schematic block diagram of a computer-based apparatus for adaptive construction of an optimal portfolio subject to a leverage constraint.
Figure 2:
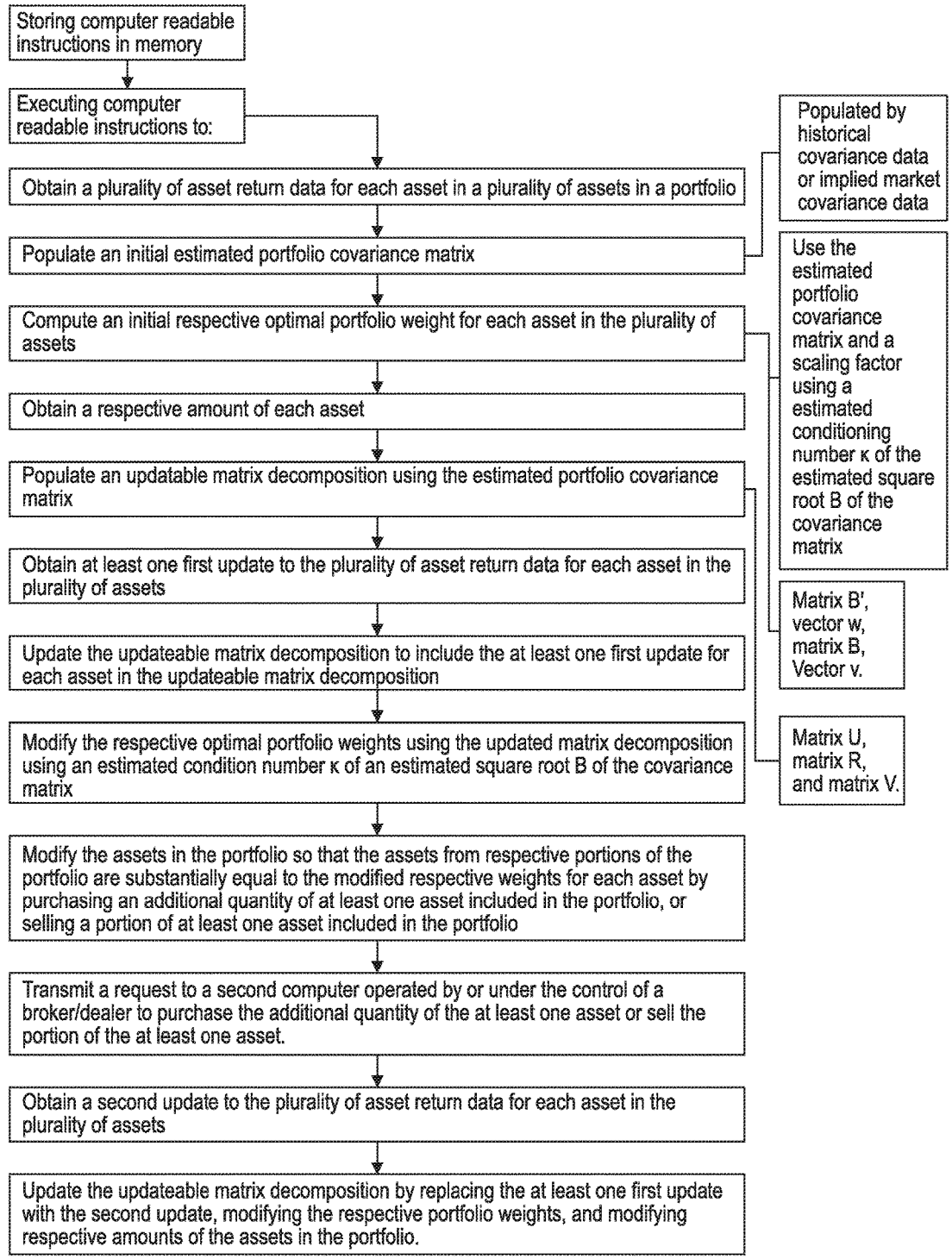
FIG. 2 is a flow chart of an embodiment of steps of a computer based method for adaptive construction of an optimal portfolio subject to a leverage constraint.

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

From the Platen et. al. papers cited above it is apparent that the naively-diversified portfolio will approach the optimal portfolio in the limit given the right technical conditions on the covariance matrix. The "in the limit" aspect is important, however, since the limit is never actually reached. The asset return covariance matrix can only be estimated based on data that has been observed to date and this estimate will change as new data becomes available. The number of rows and columns of the asset return covariance in practical applications will be finite (perhaps 500 to 1,000) and will not approach infinity since there are a finite number of securities issuers. The present disclosure is directed to improving performance within the constraint of approaching, but not attaining, the limit.

It is useful to keep track of the average returns to date and the square root of the covariance matrix (which can be done using an updateable matrix decomposition similar to Stewart's URV decomposition, described below) so that the square root of the covariance matrix can be made available efficiently as new financial data becomes available. By an "updateable matrix decomposition", we mean a matrix factorization of asset return data such that if n is the number of assets in the portfolio, and a new set of asset returns is observed, then the matrix decomposition can be updated in $O(n^2)$ operations. This means, using the "Big O" (more formally, Landau) asymptotic notation familiar in computer science, that asymptotically on the order of $n^2$ operations is required. This is in contrast to well-known matrix decompositions like the SVD (Singular Value Decomposition) which require $O(n^3)$ operations to update.

Then, the full Luenberger solution (which enables valuation of arbitrary asset portfolios, including long-short strategies, i.e. portfolios with positive and negative asset weights) and the Platen-restricted solution (which enables valuation of portfolios with nonnegative weights) can be determined at any time. Depending on the applicable attitude toward risk, the weights for a fractional optimal portfolio can be determined either with or without the Platen restriction, or with partial Platen restriction limiting how negative the weights can be (the leverage constraint). Further, the weights can be updated over time. By "weights" for a portfolio, we mean the respective portion of each asset included in the portfolio. For example, an asset comprising 5% of the portfolio would have a weight of 5%.

The present disclosure includes a method for initializing an updateable matrix decomposition similar to Stewart's URV decomposition with an priori covariance matrix using the Singular Value Decomposition (SVD) (based on historical data, market-consistent data, or an arbitrary initial estimate) as documented in "testc" from APL workspace "worldval.w3". This initial estimate is then updated adaptively.

Therefore, using the properties of the optimal portfolio, options on any of the underlying assets can be valued, as can options on any linear combination of those assets. It is therefore also possible to value options on the optimal portfolio, because the optimal portfolio is just a linear combination of the underlying assets. As an initial assumption, prices for long-dated calls would typically be more expensive than those obtained for an underlying stock index under Black-Scholes pricing, and long-dated puts would typically be relatively less expensive. The validity of this initial assumption depends on the parameters used, because the portion of the portfolio in a saving account, which is initially assumed to be riskless, is important. Under plausible assumptions, it is possible for long-term calls on the optimal portfolio to be more expensive than long-term calls on stocks (because of the optimal portfolio's outperformance of other asset portfolios), and for long-term puts to be much less expensive.

For example, simulation results in the simple two-asset case can be developed under the simplifying assumption that all parameters are known exactly and using results from Chapter 9 the Platen & Heath text. Using function "sim5" in APL workspace "copog1.w3", the expression is entered:
12345 sim5 1
to obtain the results
0.2 0.8
2.177727268 2.140826173 3.783652513 2.774770301
0.2295047564 0.2285291697 0.06423494285

In this example, the underlying assumptions are that the volatility of the equity index is 15% per year, and that the risk-free, dividend yield, and equity risk premiums are 3%, 2.2%, and 4%, respectively. The initial value of the stock index is assumed to be one. In the computed optimal portfolio, 20% of the portfolio is in a bank savings account and 80% of the portfolio is invested in the stock index. Simulating 100,000 sample paths over a thirty-year horizon with a timestep of 0.01 years using the Euler discretization, the mean and standard deviation for the ending stock index are approximately 2.18 and 2.14 respectively, as compared with the mean and standard deviation of the optimal portfolio of 3.78 and 2.77 respectively. A thirty-year put on the stock index with strike at 150% of the initial index value costs approximately 22.9% of the initial portfolio value (with prices obtained both through the Black-Scholes formula and by simulation in the real-world measure as a check) but a similar put on the optimal portfolio costs only 6.4%.

Therefore, given the assumed parameters, an insurance carrier offering a long-term guarantee of 150% of premium in a VA can reduce the cost of the guarantee by investing in the optimal portfolio rather than the stock index portfolio. The ability to consistently price and hedge options on the optimal portfolio has immense practical implications because, if a guarantee of a specific level of long-term performance for a portfolio is required, then the best choice (i.e. the choice with the lowest hedging costs relative to performance as measured by the Sharpe ratio) is the Platen-restricted optimal portfolio.

The reasoning for the transition from the optimal portfolio as formally defined and as programmed in "sim5" (including an assumption that the optimal portfolio will typically include some proportion of the risk-free asset) to the assertion that a diversified world stock portfolio, with no risk-free asset, approximates the optimal portfolio is presented below.

A theoretical explanation is provided by the Diversification Theorem (Section 7 of the Platen paper and virtually all of the Platen & Le paper). Key technical conditions (as outlined in the Platen & Le paper) are:

1. Definition 4.1 in the paper, which essentially limits how much can be invested in each asset.

2. Equation 4.4, which appears to limit continuous asset volatilities relative to jumps.

3. Equation 4.6, which limits the impact of each source of trading uncertainty.

The Naive Diversification Theorem in Platen & Rendek (*Approximating the Numeraire Portfolio by Naive Diversification*, Research Paper 281) has a technical requirement matrix to be met in Equation 4.12 in that paper. That is, in essence, if the typical element of the covariance matrix falls off faster than $1/L^{1/2}$, where L is the number of assets in the portfolio, then the naively diversified portfolio is the optimal portfolio.

It is apparent that using sectors rather than individual stocks works well when applying this theorem to actual investment: for example, two automobile manufacturers will likely have higher correlation than two companies in two different sectors. Therefore, working with sectors initially increases the likelihood that the technical conditions on the covariances required for the Naive Diversification Theorem will hold.

A much simpler (although heuristic) explanation for the assertion that a diversified world stock portfolio, with no risk-free asset, approximates the optimal portfolio is that the Luenberger solution for the optimal portfolio (see below, "luen1" in "copog1.w3") is in general leveraged (shorts the risk-free asset) because of an assumption that equities will have excess returns. If the Luenberger solution is scaled back to avoid negative weights, typically the risk-free asset forced to zero first in the resulting solution.

Operational Details:

1. In the single risky asset case with known parameters, function "sim5" in APL workspace "copog1.w3" can be used to derive portfolio weights, to simulate results, and to price options.

2. In the multiple risky asset case with known parameters, function "luen1" in APL workspace "copog1.w3" can be used to derive portfolio weights.

3. In the multiple risky asset case with known parameters, a Monte Carlo approach as in function "test3" in APL workspace "gop2.w3" can be used to derive portfolio weights and test the consistency of assumed asset returns and volatility with then-current risk-free rates.

4. In the multiple risky asset case where parameter estimation is required and updated asset return information is available, function "testc" in APL workspace "worldval.w3" is applicable, and shows how an initial covariance estimate can be improved as additional asset return data is observed while efficiently updating portfolio weights for the leverage-constrained optimal portfolio.

5. Since real-life return data can be collinear or nearly so, in real life it is unwise to assume that the covariance matrix can be inverted, for example: the matrix may be singular or close to it. A Moore-Penrose inverse or other generalized inverse can be used to overcome the singularity problem. The Moore-Penrose inverse is described in, for example, Linear Algebra and Its Applications, $2^{nd}$ edition, by Gilbert Strang, Academic Press © 1980 where it is called the "pseudoinverse". This is an important refinement in practice and is applied in the "worldva1.w3" workspace if necessary.

6. An updatable matrix decomposition similar to Stewart's URV decomposition is applied to incoming data to efficiently update the optimal portfolio composition, as described above, in the "worldva1.w3" workspace. There are two three aspects to such application:

a. The decomposition is an updatable rank-revealing decomposition that is updated using a limited number of Givens rotations, hyperbolic Givens rotations, and Householder transformations, all of which can be applied in $O(n^2)$ time. The estimated square root of the asset return covariance matrix can therefore be updated in $O(n^2)$ operations. Givens rotations and Householder transformations are described in, for example, Numerical Methods That Work, by Forman S. Acton, Harper & Row, © 1970.

b. The ideal portfolio composition can be solved for as each new vector of asset returns is received. If covariances and extra returns are fairly stable then the solution will be relatively stable. Rebalancing at intervals (quarterly or more frequently) can be performed. Depending on the estimated condition number of the square root of the covariance matrix, either an $O(n^3)$ (or preferably an $O(n^2)$) solution method is used to develop the updated weights. Condition number estimation for a right-triangular matrix is described in Section 3.5.4 of Matrix Computations, $2^{nd}$ edition, by Gene H. Golub and Charles F. Van Loan © 1989 The Johns Hopkins University Press. Note also that both forward and backward substitution in a triangular system can be performed in $O(n^2)$ operations as outlined in Section 3.1 of the same text.

According to a paper on "naive diversification" (defined as equal allocation across the available asset classes), as stated in *Optimal Versus Naive Diversification: How Inefficient is the 1/N Portfolio Strategy?*, by Victor DeMiguel, Lorenzo Garlappi, and Raman Uppal, (c) 2007 Oxford University Press, available at: http://faculty.london.edu/avmiguel/DeMiguel-Garlappi-Uppal-RFS.pdf), short-sale constraints can be addressed by scaling the covariance matrix used in optimization. This is not intuitively obvious, and suggests a simple algorithm as follows:

1. Solve naively. If all asset proportions are nonnegative the solution is finished.

2. If any asset proportions are negative, scale down the covariance matrix to get the portfolio that just barely avoids negative asset proportions.

3. A variation of this approach is implemented in function "luen1" in which excess returns, rather than covariances, are scaled.

Program Method of Operation: updateable matrix decomposition source is in ls5.dpr The rank-revealing URV decomposition is an updateable matrix decomposition sharing many of the desirable characteristics of the Singular Value Decomposition. The URV matrix decomposition was introduced by G. W. Stewart in *An Updating Algorithm for Subspace Tracking* (IEEE Transactions on Signal Processing, Vol. 40, No. 6, June 1992) for phased-array radar applications. The decomposition takes its name from the decomposition of a general matrix into orthogonal matrices U and V and a right triangular matrix R as described below. Some key characteristics are:

1. The decomposition is A=URV' where U and V are orthogonal and R is right-triangular.

2. Rank deficiency can be detected easily because the determinant of R is just the product of its diagonal elements.

3. Constructing the decomposition uses only Givens rotations, which are orthogonal transformations, so the problem is as well-conditioned as possible.

4. The method allows efficient determination of the condition number of the problem (since efficient condition number estimators for the triangular matrix R exist, and since the condition numbers for orthogonal matrices U and V are one by definition).

Note that "testc" calls into "L55.DLL" which implements an updateable matrix decomposition similar to the URV decomposition, but with the following additional characteristics:

1) Exponential weighting is supported so that older asset return data (possibly from a different market regime) can accorded less weight than more recent asset return data.

2) The square root of the (possibly exponentially-weighted) covariance matrix can be generated from the R matrix in $O(n^2)$ time using a limited number of hyperbolic Givens rotations and Householder transformations.

Also note that "testc" initializes the updateable matrix decomposition using pseudo-data created with function "svd3." This allows for the use of an arbitrary initial estimate of the covariance matrix that can then be updated as additional data is observed.

Function Description. Program is implemented in APL and Delphi. The Delphi component is a DLL (dynamic link library) that can be called from an interpreted language such as APL but provides the speed of a compiled language.

The following are the top level functions: "sim5"; "luen1"; "test3"; and "testc."

Top-level function "sim5" in APL workspace "copog1.w3": method of operation:

1. Compute portfolio proportions in risk-free and risk assets.

2. Simulate, using Euler discretization, sample paths for the stock index and the growth-optimal portfolio.

3. Display the mean and standard deviation for terminal values of stock index and growth-optimal portfolio.

4. Compute an example put option value for the stock index using the Black-Scholes formula.

5. Compute an example put option value for the stock index using an average over sample paths.

6. Compute an example put option value for the growth-optimal portfolio using an average over sample paths.

7. Display the results of the computations in steps 4 through 6.

Functions called by "sim5" (with notes on operation and subfunction calls):

1. norm—generate a vector of normally-distributed random numbers.

2. msd—calculate mean and standard deviation of a vector of numbers.

3. black—use the Black-Scholes formula for a European option to compute the call price, put price, call delta, put delta, and call gamma, based on security price, exercise price, time to expiry, the riskfree rate, the dividend rate, and volatility (standard deviation of returns).

4. unormf—calculate an approximate percentile of the cumulative distribution function of the normal distribution, using an approximation from the Handbook of Mathematical Functions by Milton Abramowitz and Irene Stegun.

Top-level function "luen1" in APL workspace "copog1.w3": method of operation:
1. Calculate portfolio weights using built-in APL matrix inversion and display.
2. Calculate portfolio weights using the Moore-Penrose inverse and display.
3. Calculate portfolio weights using the Moore-Penrose inverse and a scaling factor and display.
4. Calculate portfolio weights using SVD and a scaling factor and display.
5. Calculate portfolio weights using SVD, the Moore-Penrose inverse, and a scaling factor and display.

Functions called by "luen1" (with notes on operation and subfunction calls):
1. mpi—calculates the Moore-Penrose inverse of a matrix using SVD (the singular value decomposition).
2. svd3—factors a matrix into matrices U, W, and V, where U and V are orthogonal matrices and W is a diagonal matrix. Calls into Delphi DLL "svd3.dll".

Top-level function "test3" in APL workspace "gop2.w3": method of operation:
1. Generate multivariate asset scenarios using assumed growth rates and covariances.
2. Generate multiple sets of random nonnegative portfolio weights.
3. Approximate the optimal portfolio weights as the generated set of weights maximizing the expected log-return over the scenarios.
4. Calculate and display the implied risk-free rate calculated from the Luenberger equation $E[1/R^*]=1/R$.
5. Calculate and display call and put option prices from the generated scenarios.
6. Calculate and display call and put option prices from the Black-Scholes formula using the implied risk-free rate and a volatility derived from the covariance matrix and the portfolio weights.

To the extent that the implied risk-free rate displayed in step (4) differs materially from current risk-free rates, then the scenario generation assumptions may not be market consistent.

Functions called by "test3" (with notes on operation and subfunction calls):
1. genScens3—generate multivariate asset scenarios using assumed growth rates and an assumed covariance matrix.
2. choleski—calculate the Choleski square-root decomposition of a positive definite symmetric matrix.
3. norm—generate a vector of normally-distributed random numbers.
4. genRandomWeights—generate random nonnegative portfolio weights summing to 1 using Procedure 4 described by Wang and Zionts in their paper *Random-Weight Generation in Multiple Criteria Decision Models* (available at http://citeseerx.ist.psu.edu/viewdoc/download?doi=10.1.1.109.791&rep=rep1&type=pdf)
5. sort—sort a vector of numbers into ascending order.
6. black—use the Black-Scholes formula for a European option to compute the call price, put price, call delta, put delta, and call gamma, based on security price, exercise price, time to expiry, the riskfree rate, the dividend rate, and volatility (standard deviation of returns).
7. unormf—calculate an approximate percentile of the cumulative distribution function of the normal distribution, using an approximation from the Handbook of Mathematical Functions by Milton Abramowitz and Irene Stegun.

Top-level function "testc" in APL workspace "worldva1.w3": method of operation:
1. Generate an assumed actual underlying covariance matrix using rebff2 with one set of parameters and randomly-generated variances.
2. Generate an estimated covariance matrix using rebff2 with a perturbed set of parameters and a second set of randomly-generated variances.
3. Using SVD, generate pseudo-data to initialize the updateable matrix decomposition with the square root of the estimated covariance matrix.
4. Repeatedly simulate asset return data from the assumed actual covariance matrix and use it to update the matrix decomposition.
5. Output results demonstrating that the estimated square root of the covariance matrix, times its transpose, converges on the assumed actual covariance matrix (Note that the convergence test runs in $O(n^3)$ time and is a diagnostic, not part of the algorithm per se).
6. Using the estimated condition number κ of the estimated square root of the covariance matrix, solve for updated portfolio weights using one of two methods:
   A. If the estimated condition number κ is within tolerance, solve using forward and backward substitution in a triangular system (runs in $O(n^2)$ operation).
   B. If the estimated condition number κ is out of tolerance, solve using the Moore-Penrose inverse (runs in $O(n^3)$ operations).

Functions called by "testc" (with notes on operation and subfunction calls):
1. rebff2—generates a positive definite correlation matrix from input parameters.
2. svd3—factors a matrix into matrices U, W, and V, where U and V are orthogonal matrices and W is a diagonal matrix. Calls into Delphi DLL "svd3.dll"
3. ls_get_handle—calls into LS5 dll to set up a regression context and return a handle to it.
4. ls_add_data—calls into LS5 dll to add a new row of data to a regression context by folding it into the R matrix and making required changes to the other matrices in the regression context. "Folding it into" means adding it as a new row to the R matrix and then applying Givens rotations in a sequence that a) reduces each element of the new row to zero and b) preserves the upper-triangular structure of the R matrix. Also tracks the (possibly exponentially-weighted) mean and mean square for each item (asset return) in the row for use in ls_get_root_covar.
5. ls_get_root_covar—calls into LS5 dll to return the square root of the covariance matrix associated with a regression context. The Delphi procedure TLSContext.getRootCovar implements this calculation. Key steps in the implementation include:
   A. Adjusting the R matrix to remove the mean for each item using hyperbolic Givens rotations if necessary;
   B. Constructing an n by n matrix of adjustment factors for exponential weighting (where n is the number of asset returns) and apply two Householder transformations, zeroing out all but the top left 3 by 3 submatrix.
   C. Finding the two nonzero eigenvalues of the submatrix and transform the associated eigenvectors of length 3 back up to length n by applying the inverses of the Householder transformations in step 2.
   D. Updating the R matrix with the two eigenvectors using either ordinary or hyperbolic Givens rotations depending on the signs of the associated eigenvalues.
6. mpi—calculates the Moore-Penrose inverse of a matrix using SVD (the singular value decomposition).
7. condest—estimates the condition number of a triangular matrix.

8. lforward—performs forward substitution into a left (lower) triangular matrix.

9. tback—performs back substitution into a right (upper) triangular matrix.

10. ls_close_handle—calls into LS5 dll to deallocate a regression context handle.

For the functions in (7)-(9), condition estimators, forward substitution, and backward substitution are described above: Algorithmic Details.

FIG. 1 is a schematic block diagram of computer-based apparatus 100 for adaptive construction of an optimal portfolio subject to a leverage constraint. Apparatus 100 includes computer 102 with memory element 104 and processor 106. Element 104 is configured to store computer executable instructions 108 and portfolio 110. Processor 106 is configured to execute the computer readable instructions to obtain asset return data 112 for each asset 114 in portfolio 110 and populate initial estimated portfolio covariance matrix 116, including rows 118 and columns 120. Each row 118 represents a respective asset 114A from assets 114 in portfolio 110. Each column 120 represents a respective asset 114B from assets 114. Each entry 122 in initial estimated portfolio covariance matrix 116 is a co-variance 122 of return 124A of asset 114A for the respective row 118 with respect to return 124B of asset 114B for the respective column 120.

Processor 106 is configured to execute the computer readable instructions to compute initial respective optimal portfolio weight 126 for each asset 114. Each respective optimal portfolio weight 126 is a respective proportion of the respective asset 114 included the portfolio. Processor 106 is configured to execute the computer readable instructions to obtain respective amount 128 of each asset 114 such that each asset 114 forms a respective portion of portfolio 110 substantially equal to weight 126 for the asset. Processor 106 is configured to execute the computer readable instructions to populate updateable matrix decomposition 130 using initial estimated portfolio covariance matrix 116 and scaling factor 132. Scaling factor 132 limits degree of negativity 134 for each portfolio weight 126.

Processor 106 is configured to execute the computer readable instructions to obtain at least one update 136 to asset return data 112 and update matrix decomposition 130 to include respective update 136 for each asset 114 in matrix decomposition 130. Matrix decomposition 130 is updated for one new row of asset return data 112 at a time and the floating-point operation count to perform the update is asymptotically no more than quadratic in the number of assets 114. Processor 106 is configured to execute the computer readable instructions to modify portfolio weights 126 using matrix decomposition 130, and modify assets 114 so that assets 114 form respective portions of portfolio 110 substantially equal to the respective modified weights 126 for each asset 114 by: purchasing additional quantity 138 of at least one asset 114 included in portfolio 110 to increase an amount of the at least one asset 114 included in portfolio 110; or, selling portion 140 of at least one asset 114 included in portfolio 110 to decrease an amount of the at least one asset 114 included in portfolio 110.

In an example embodiment, processor 106 is configured to execute the computer readable instructions to obtain at least one update 142 to asset return data 112 for each asset 114 and update matrix decomposition 130 by: replacing each update 136 in matrix decomposition 130 with a respective at least one update 142; modify the optimal portfolio weights 126 using the updated matrix decomposition 130; and modify respective amounts of assets 114 in portfolio 110 so that each asset 114 forms a respective portions of the portfolio 110 substantially equal to modified weight 126 for the asset.

In an example embodiment, modifying respective optimal portfolio weights 126 using updated matrix decomposition 130 includes: using estimated condition number κ of the estimated square root B of covariance matrix 116. In the case where κ is within tolerance 144, updated portfolio weights 126 are computed by performing back substitution with matrix B' and vector w, where the vector w is computed by performing forward substitution with the matrix B and the vector v. In the case where κ is out of tolerance 144, updated portfolio weights 126 are computed as M'*M*v, where M is the Moore-Penrose inverse of B, * is the matrix product, ' is the matrix transpose and v is the scaling factor times the excess of the expected return for each asset over the risk-free rate.

In an example embodiment, the processor for the computer configured to execute the computer readable instructions to obtain historical covariance data 146, and populating initial estimated portfolio covariance matrix 116 includes populating initial estimated portfolio covariance matrix 116 with historical covariance data 146. In an example embodiment, processor 106 is configured to execute the computer readable instructions too obtain implied market covariance data 148 and populating initial estimated portfolio covariance matrix 116 includes populating initial estimated portfolio covariance matrix 116 with implied market covariance data 148.

In an example embodiment, computing initial respective optimal portfolio weight 126 for each asset 114 includes using estimated portfolio covariance matrix 116 and scaling factor 132. In an example embodiment, using estimated portfolio covariance matrix 116 and scaling factor 132 includes using estimated condition number κ of the estimated square root B of covariance matrix 116. In the case where κ is within tolerance 144, updated portfolio weights 126 are computed by performing back substitution with matrix B' and vector w, where the vector w is computed by performing forward substitution with the matrix B and the vector v. In the case where κ is out of tolerance 144, updated portfolio weights 126 are computed as M'*M*v, where M is the Moore-Penrose inverse of B, * is the matrix product, ' is the matrix transpose and v is the scaling factor times the excess of the expected return for each asset over the risk-free rate.

In an example embodiment, computing initial respective optimal portfolio weight 126 for each asset 114 includes computing each respective optimal portfolio weight 126 as a proportion of a number 150 of assets 114 in portfolio 110. In an example embodiment, computing initial respective optimal portfolio weight 126 for each asset 114 includes computing each optimal portfolio weight 126 equal to a same value.

In an example embodiment, populating matrix decomposition 130 includes performing respective operations on matrix U, matrix R, and matrix V. Matrices U and V are respective orthogonal matrices and matrix R is a right-triangular matrix. In an example embodiment, performing respective operations on matrix U, matrix R, and matrix V includes using a sequence of Givens rotations to maintain the right-triangular structure of matrix R. In an example embodiment, performing respective operations on matrix U, matrix R, and matrix V includes using a sequence of ordinary and hyperbolic Givens rotations. In an example embodiment, performing respective operations on matrix U, matrix R, and matrix V includes using a sequence of ordinary and hyperbolic Givens rotations and Householder transformations.

In an example embodiment, portfolio 110 is included in tax-deferred variable annuity 152. In an example embodiment, portfolio 110 is included in tax-flow-through variable annuity 154.

In an example embodiment, the processor for the computer configured to execute the computer readable instructions to transmit request 156 to computer 158 operated by or under the control of a broker/dealer to purchase quantity 138 or sell portion 140. A dealer/broker is defined as an entity registered with the Securities and Exchange Commission, under the Exchange Act of 1934 to trade securities.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A computer-based method for adaptive construction of an optimal portfolio subject to a leverage constraint, comprising:
   storing computer executable instructions in a memory element of a first computer; and,
   executing, using a processor for the computer, the computer readable instructions to:
      obtain a plurality of asset return data for each asset in a plurality of assets in a portfolio;
      populate an initial estimated portfolio covariance matrix, wherein:
         each row in the initial estimated portfolio covariance matrix represents an asset from the plurality of assets;
         each column in the initial estimated portfolio covariance matrix represents an asset from the plurality of assets; and,
         each entry in the initial estimated portfolio covariance matrix is a co-variance of a return of the asset represented in the row for said each entry with respect to performance of the asset represented in the column for said each entry;
      compute an initial respective optimal portfolio weight for each asset included in the plurality of assets, each respective optimal portfolio weight being a respective proportion of said each asset included in the portfolio;
      obtain a respective amount of said each asset such that said each asset forms a respective portion of the portfolio substantially equal to the respective weight for said each asset;
      populate an updateable matrix decomposition using the estimated portfolio covariance matrix and a scaling factor, the scaling factor limiting a degree of negativity for said each respective optimal portfolio weight;
      obtain at least one first update to the plurality of asset return data for said each asset in the plurality of assets;
      update the updateable matrix decomposition to include the at least one first update to return data for each asset in the updateable matrix decomposition;
      modify the respective optimal portfolio weights using the updated matrix decomposition; and,
      modify the assets in the portfolio so that the assets forming respective portions of the portfolio are substantially equal to the modified respective weights for the assets by:
         purchasing an additional quantity of at least one asset included in the portfolio to increase an amount of the at least one asset included in the portfolio; or,
         selling a portion of at least one asset included in the portfolio to decrease an amount of the at least one asset included in the portfolio;
      wherein the updateable matrix decomposition is updated for one new row of asset returns at a time; and,
      a number of floating-point operations used to perform the update is asymptotically less than or equal to a quadratic in a number of assets.

2. The computer-based method of claim 1, further comprising:
   executing, using a processor for the computer, the computer readable instructions to:
      transmit a request, to a second computer operated by or under the control of a broker/dealer, to:
         purchase the additional quantity of at the least one asset; or,
         sell the portion of the at least one asset.

3. The computer-based method of claim 1, further comprising:
   executing, using a processor for the computer, the computer readable instructions to:
      obtain at least one second update to the plurality of asset return data for said each asset; and,
      update the updateable matrix decomposition by:
         replacing each at least one first update in the updated matrix decomposition with a respective at least one second update;
         modifying the respective optimal portfolio weights using the updated matrix decomposition; and,
         modifying respective amounts of the assets in the portfolio so that said each asset forms a respective portion of the portfolio substantially equal to the respective modified weights for said each asset.

4. The computer-based method of claim 3, wherein modifying the respective optimal portfolio weights using the updated matrix decomposition includes:
   using an estimated condition number κ of an estimated square root B of the covariance matrix; and:
      in a case where κ is within tolerance, said updated portfolio weights are computed by performing back substitution with a matrix B' and a vector w, where the vector w is computed by performing forward substitution with a matrix B and a vector v; or,
      in a case where κ is out of tolerance, said updated portfolio weights are computed as M'*M*v, where:
         M is the Moore-Penrose inverse of B;
         * is the matrix product;
         ' is the matrix transpose; and,
         v is the scaling factor times an excess of an expected return for each asset over a risk-free rate.

5. The computer-based method of claim 1, further comprising:
   executing, using a processor for the computer, the computer readable instructions to:
      obtain historical covariance data, wherein populating the initial estimated portfolio covariance matrix includes populating the initial estimated portfolio covariance matrix with the historical covariance data.

6. The computer-based method of claim 1, further comprising:
executing, using a processor for the computer, the computer readable instructions to:
obtain implied market covariance data, wherein populating the initial estimated portfolio covariance matrix includes populating the initial estimated portfolio covariance matrix with the implied market covariance data.

7. The computer-based method of claim 1, wherein computing an initial respective optimal portfolio weight for each asset included in the plurality of assets includes using the estimated portfolio covariance matrix and the scaling factor.

8. The computer-based method of claim 7, wherein using the estimated portfolio covariance matrix and the scaling factor includes:
using an estimated condition number κ of an estimated square root B of the covariance matrix; and:
in a case where κ is within tolerance, said updated portfolio weights are computed by performing back substitution with a matrix B' and a vector w, where the vector w is computed by performing forward substitution with a matrix B and a vector v; or,
in a case where κ is out of tolerance, said updated portfolio weights are computed as M'*M*v, where:
M is the Moore-Penrose inverse of B;
* is the matrix product;
' is the matrix transpose; and,
v is the scaling factor times an excess of an expected return for each asset over a risk-free rate.

9. The computer-based method of claim 1, wherein computing an initial respective optimal portfolio weight for each asset included in the plurality of assets includes computing said each respective optimal portfolio weight as a proportion of the number of assets in the portfolio.

10. The computer-based method of claim 1, wherein computing an initial respective optimal portfolio weight for each asset included in the plurality of assets includes computing said respective optimal portfolio weight equal to a same value.

11. The computer-based method of claim 1, wherein:
populating an updateable matrix decomposition includes performing respective operations on matrix U, matrix R, and matrix V; and,
matrices U and V are respective orthogonal matrices and matrix R is a right-triangular matrix.

12. The computer-based method of claim 11, wherein performing respective operations on matrix U, matrix R, and matrix V includes using a sequence of Givens rotations to maintain a right-triangular structure of matrix R.

13. The computer-based method of claim 11, wherein performing respective operations on matrix U, matrix R, and matrix V includes using a sequence of ordinary and hyperbolic Givens rotations.

14. The computer-based method of claim 11, wherein performing respective operations on matrix U, matrix R, and matrix V includes using a sequence of ordinary and hyperbolic Givens rotations and Householder transformations.

15. A tax-deferred variable annuity deploying the method recited in claim 1.

16. A tax-flow-through variable annuity deploying the method recited in claim 1.

17. The computer-based apparatus of claim 1, wherein computing an initial respective optimal portfolio weight for each asset included in the plurality of assets includes using the estimated portfolio covariance matrix and the scaling factor.

18. The computer-based apparatus of claim 17, wherein using the estimated portfolio covariance matrix and the scaling factor includes:
using an estimated condition number κ of an estimated square root B of the covariance matrix; and:
in a case where κ is within tolerance, said updated portfolio weights are computed by performing back substitution with a matrix B' and a vector w, where the vector w is computed by performing forward substitution with a matrix B and a vector v; or,
in a case where κ is out of tolerance, said updated portfolio weights are computed as M'*M*v, where:
M is the Moore-Penrose inverse of B;
* is the matrix product;
' is the matrix transpose; and,
v is the scaling factor times an excess of an expected return for each asset over a risk-free rate.

19. A computer-based apparatus for adaptive construction of an optimal portfolio subject to a leverage constraint, comprising:
a memory element of a computer configured to store computer executable instructions; and,
a processor for the computer configured to execute the computer readable instructions to:
obtain a plurality of asset return data for said each asset in a plurality of assets in a portfolio;
populate an initial estimated portfolio covariance matrix, wherein:
each row in the initial estimated portfolio covariance matrix represents an asset from the plurality of assets;
each column in the initial estimated portfolio covariance matrix represents an asset from the plurality of assets; and,
each entry in the initial estimated portfolio covariance matrix is a co-variance of a return of the asset represented in the row for said each entry with respect to performance of the asset represented in the column for said each entry;
compute an initial respective optimal portfolio weight for each asset included in the plurality of assets, each respective optimal portfolio weight being a respective proportion of said each asset included in the portfolio;
obtain a respective amount of said each asset such that said each asset forms a respective portion of the portfolio substantially equal to the respective weight for said each asset;
populate an updateable matrix decomposition using the estimated portfolio covariance matrix and a scaling factor, the scaling factor limiting a degree of negativity for said each respective optimal portfolio weight;
obtain at least one first update to the plurality of asset return data for said each asset in the plurality of assets;
update the updateable matrix decomposition to include the at least one first update to return data for each asset in the updateable matrix decomposition;
modify the respective optimal portfolio weights using the updated matrix decomposition; and,
modify the assets in the portfolio so that the assets form respective portions of the portfolio substantially equal to the modified respective weights for the assets by:

purchasing an additional quantity of at least one asset included in the portfolio to increase an amount of the at least one asset included in the portfolio; or, selling a portion of at least one asset included in the portfolio to decrease an amount of the at least one asset included in the portfolio, wherein the updateable matrix decomposition is updated for one new row of asset returns at a time, and, a number of floating-point operations used to perform the update is asymptotically less than or equal to a quadratic in a number of assets.

20. The computer-based apparatus of claim 19, wherein the processor for the computer is configured to execute the computer readable instructions to:

transmit a request, to a second computer operated by or under the control of a broker/dealer, to:
purchase the additional quantity of at the least one asset; or,
sell the portion of the at least one asset.

21. The computer-based apparatus of claim 19, wherein the processor for the computer is configured to execute the computer readable instructions to:

obtain at least one second update to the plurality of asset return data for said each asset: and, update the updateable matrix decomposition by:
replacing each at least one first update in the updated matrix decomposition with a respective at least one second update;
modifying the respective optimal portfolio weights using the updated matrix decomposition; and,
modifying respective amounts of the assets in the portfolio so that said each asset forms a respective portion of the portfolio substantially equal to the respective modified weights for said each asset.

22. The computer-based apparatus of claim 19, wherein modifying the respective optimal portfolio weights using the updated matrix decomposition includes:

using an estimated condition number κ of an estimated square root B of the covariance matrix; and:
in a case where κ is within tolerance, said updated portfolio weights are computed by performing back substitution with a matrix B' and a vector w, where the vector w is computed by performing forward substitution with a matrix B and a vector v; or,
in a case where κ is out of tolerance, said updated portfolio weights are computed as M'*M*v, where:
M is the Moore-Penrose inverse of B;
* is the matrix product;
' is the matrix transpose; and, v is the scaling factor times an excess of an expected return for each asset over a risk-free rate.

23. The computer-based apparatus of claim 19, wherein:
the processor for the computer configured to execute the computer readable instructions to obtain historical covariance data; and,
populating the initial estimated portfolio covariance matrix includes populating the initial estimated portfolio covariance matrix with the historical covariance data.

24. The computer-based apparatus of claim 19, wherein:
the processor for the computer configured to execute the computer readable instructions to obtain implied market covariance data; and,
populating the initial estimated portfolio covariance matrix includes populating the initial estimated portfolio covariance matrix with the implied market covariance data.

25. The computer-based apparatus of claim 19, wherein computing an initial respective optimal portfolio weight for each asset included in the plurality of assets includes computing said each respective optimal portfolio weight as a proportion of the number of assets in the portfolio.

26. The computer-based apparatus of claim 19, wherein computing an initial respective optimal portfolio weight for each asset included in the plurality of assets includes computing said respective optimal portfolio weight equal to a same value.

27. The computer-based apparatus of claim 26, wherein:
populating an updateable matrix decomposition includes performing respective operations on matrix U, matrix R, and matrix V; and,
matrices U and V are respective orthogonal matrices and matrix R is a right-triangular matrix.

28. The computer-based apparatus of claim 26, wherein performing respective operations on matrix U, matrix R, and matrix V includes using a sequence of Givens rotations to maintain a right-triangular structure of matrix R.

29. The computer-based apparatus of claim 26, wherein performing respective operations on matrix U, matrix R, and matrix V includes using a sequence of ordinary and hyperbolic Givens rotations.

30. The computer-based apparatus of claim 26, wherein performing respective operations on matrix U, matrix R, and matrix V includes using a sequence of ordinary and hyperbolic Givens rotations and Householder transformations.

31. A tax-deferred variable annuity deploying the apparatus recited in claim 19.

32. A tax-flow-through variable annuity deploying the apparatus recited in claim 19.

* * * * *